US012036678B2

(12) United States Patent
Tang et al.

(10) Patent No.: US 12,036,678 B2
(45) Date of Patent: *Jul. 16, 2024

(54) TRANSPARENT OBJECT BIN PICKING

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 506 days.

This patent is subject to a terminal disclaimer.

(21) Appl. No.: 17/329,513

(22) Filed: May 25, 2021

(65) Prior Publication Data

US 2022/0379475 A1 Dec. 1, 2022

(51) Int. Cl.
| | |
|---|---|
| *B25J 9/16* | (2006.01) |
| *G06N 3/08* | (2023.01) |
| *G06T 7/10* | (2017.01) |
| *G06T 7/70* | (2017.01) |
| *H04N 13/239* | (2018.01) |

(52) U.S. Cl.
CPC ........... *B25J 9/1669* (2013.01); *B25J 9/1697* (2013.01); *G06N 3/08* (2013.01); *G06T 7/10* (2017.01); *G06T 7/70* (2017.01); *H04N 13/239* (2018.05); *G06T 2207/10012* (2013.01); *G06T 2207/10024* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 8,073,243 B2* | 12/2011 | Mareachen | .......... | H04N 19/167 |
| | | | | 382/173 |
| 2017/0358092 A1* | 12/2017 | Bleibel | .................. | H04N 5/272 |
| 2020/0156254 A1* | 5/2020 | Li | ......................... | G06V 30/248 |
| 2021/0023720 A1* | 1/2021 | Du | ........................ | B25J 9/1669 |

(Continued)

OTHER PUBLICATIONS

Wong et al ("SegICP: Integrated Deep Semantic Segmentation and Pose Estimation," 2017 IEEE/RSJ International Conference on Intelligent Robots and Systems, 2017, pp. 1-6) (Year: 2017).*

(Continued)

*Primary Examiner* — Leon Viet Q Nguyen
(74) *Attorney, Agent, or Firm* — John A. Miller; Shumaker, Loop & Kendrick LLP

(57) ABSTRACT

A system and method identifying an object, such as a transparent object, to be picked up by a robot from a bin of objects. The method includes obtaining a 2D red-green-blue (RGB) color image and a 2D depth map image of the objects using a 3D camera, where pixels in the depth map image are assigned a value identifying the distance from the camera to the objects. The method generates a segmentation image of the objects using a deep learning mask R-CNN (convolutional neural network) that performs an image segmentation process that extracts features from the RGB image and assigns a label to the pixels so that objects in the segmentation image have the same label. The method then identifies a location for picking up the object using the segmentation image and the depth map image.

20 Claims, 3 Drawing Sheets

(56) References Cited

U.S. PATENT DOCUMENTS

| | | | | |
|---|---|---|---|---|
| 2021/0187751 A1* | 6/2021 | Maeda | ................... | B25J 9/1697 |
| 2021/0382497 A1* | 12/2021 | Zhi | ....................... | G06V 10/26 |
| 2022/0152825 A1* | 5/2022 | Hansen | ................. | B25J 13/089 |

OTHER PUBLICATIONS

Kalra et al ("Deep polarization cues for transparent object segmentation." Proceedings of the IEEE/CVF Conference on Computer Vision and Pattern Recognition. 2020, pp. 8602-8611, retrieved from the Internet on Jan. 28, 2024) (Year: 2020).*

Zhu et al. ("Image Processing for Picking Task of Random Ordered PET Drinking Bottles," Journal of Robotics, Networking and Artificial Life, 2019, pp. 38-41) (Year: 2019).*

Nakahara et al ("An object detector based on multiscale sliding window search using a fully pipelined binarized CNN on an FPGA," 2017 International Conference on Field Programmable Technology (ICFPT), 2017, pp. 168-175, doi: 10.1109/FPT.2017.8280135) (Year: 2017).*

* cited by examiner

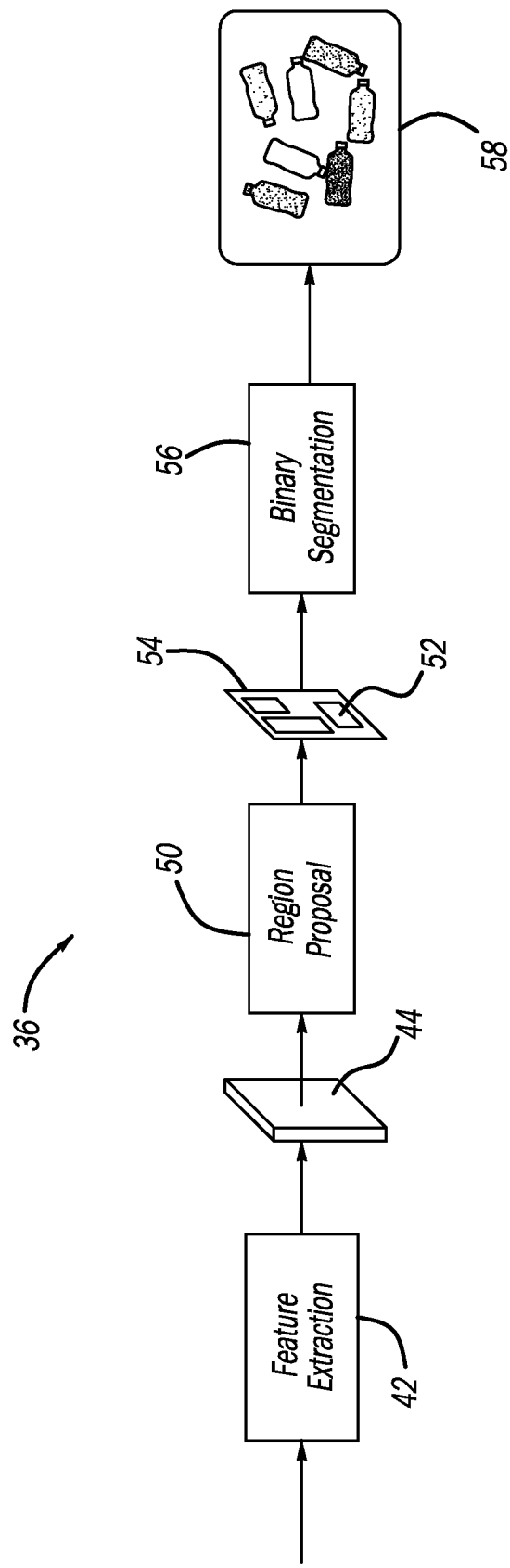

TRANSPARENT OBJECT BIN PICKING

BACKGROUND

Field

This disclosure relates generally to a system and method for identifying an object to be picked up by a robot from a bin of objects and, more particularly, to a system and method for identifying an object, such as a transparent object, to be picked up by a robot from a bin of objects, where the method employs an image segmentation process that assigns a label to every pixel in an image of the bin.

Discussion of the Related Art

Robots perform a multitude of tasks including pick and place operations, where the robot picks up and moves objects from one location, such as a bin, to another location, such as a conveyor belt. In order to identify an object being picked up from a bin, some robot systems employ a 3D camera that generates 2D red-green-blue (RGB) color images of the bin and 2D gray scale depth map images of the bin, where each pixel in the depth map image has a value that defines the distance from the camera to a particular object, i.e., the closer the pixel is to the object the lower its value. The depth map images identify distance measurements to points in a point cloud in the field-of-view of the camera, where a point cloud is a collection of data points that is defined by a certain coordinate system and each point has x, y and z value.

There are two general types of point cloud analysis for this purpose, namely, model-free point cloud analysis and model-based point cloud analysis. Model-free point cloud analysis includes identifying clusters of points in the point cloud in a normal direction from the camera and segmenting the clusters relative to each other, where each point cloud segment is identified as an object. Model-based point cloud analysis includes creating templates from a CAD model of the objects and then searching for the template in the point cloud. However, if the object that is being picked up by the robot is transparent, light propagates through the object and is not effectively reflected from a surface of the object. Therefore, the point cloud generated by the camera is not an effective representation of the object and the depth map image is not reliable, and thus the object cannot be properly identified to be picked up.

SUMMARY

The following discussion discloses and describes a system and method for identifying an object to be picked up by a robot from a bin of objects. The method includes obtaining a 2D red-green-blue (RGB) color image and a 2D depth map image of the objects using a 3D camera, where pixels in the depth map image are assigned a value identifying the distance from the camera to the objects. The method generates a segmentation image of the objects using a deep learning mask R-CNN (convolutional neural network) that performs an image segmentation process that extracts features from the RGB image and assigns a label to the pixels so that objects in the segmentation image have the same label. The method then identifies a location for picking up the object using the segmentation image and the depth map image, where obtaining a color image, obtaining a depth map image, generating a segmentation image and identifying a location for picking up the object are performed each time an object is picked up from the group of objects by the robot.

Additional features of the disclosure will become apparent from the following description and appended claims, taken in conjunction with the accompanying drawings.

BRIEF DESCRIPTION OF THE DRAWINGS

FIG. 3 is a schematic block diagram of a segmentation module separated from the system shown in FIG. 2.

DETAILED DESCRIPTION OF THE EMBODIMENTS

The following discussion of the embodiments of the disclosure directed to a system and method for identifying an object to be picked up by a robot from a bin of the objects, where the method employs an image segmentation process that assigns a label to every pixel in an image of the bin, is merely exemplary in nature, and is in no way intended to limit the invention or its applications or uses. For example, the system and method have application for identifying a transparent object to be picked up by a robot. However, the system and method may have other applications.

Figure 1:
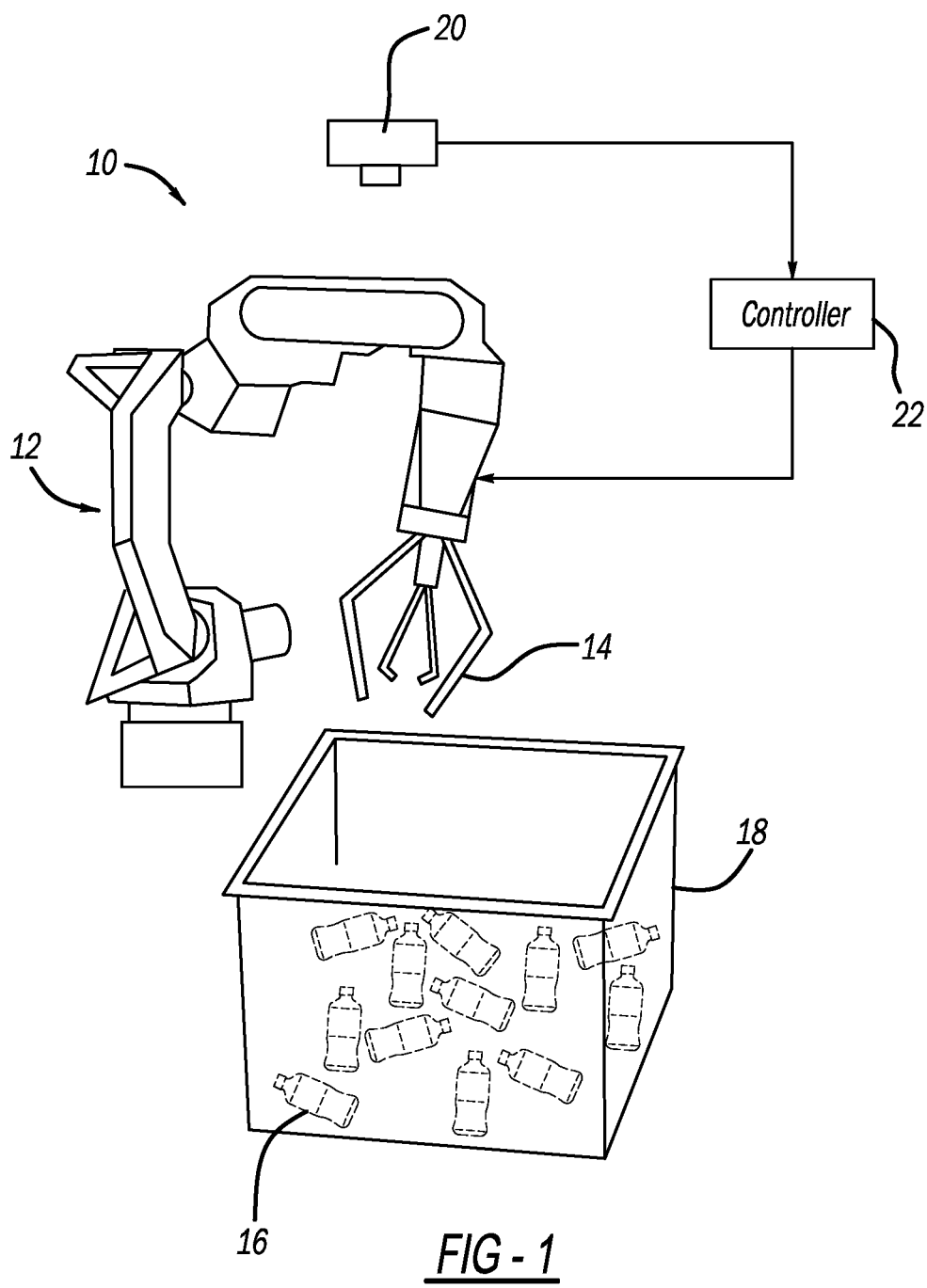
FIG. 1 is an illustration of a robot system including a robot picking up objects out of a bin.

FIG. 1 is an illustration of a robot system 10 including a robot 12 having an end-effector 14 that is shown picking up objects 16, for example, transparent bottles, from a bin 18. The system 10 is intended to represent any type of robot system that can benefit from the discussion herein, where the robot 12 can be any robot suitable for that purpose. A 3D camera 20 is positioned to take top down images of the bin 18 and provide them to a robot controller 22 that controls the movement of the robot 12. Because the objects 16 can be transparent, the controller 22 cannot rely on a depth map image provided by the camera 20 to identify the location of the objects 16 in the bin 18.

As will be discussed in detail below, the robot controller 22 employs an algorithm that allows the robot 12 to pick up the objects 16 without having to rely on an accurate depth map image. More specifically, the algorithm performs an image segmentation process using the different colors of the pixels in the RGB image from the 3D camera 20. Image segmentation is a process of assigning a label to every pixel in an image such that pixels with the same label share certain characteristics. Thus, the segmentation process predicts which pixel belongs to which of the objects 16.

Modern image segmentation techniques may employ deep learning technology. Deep learning is a particular type of machine learning that provides greater learning performance by representing a certain real-world environment as a hierarchy of increasing complex concepts. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Figure 2:
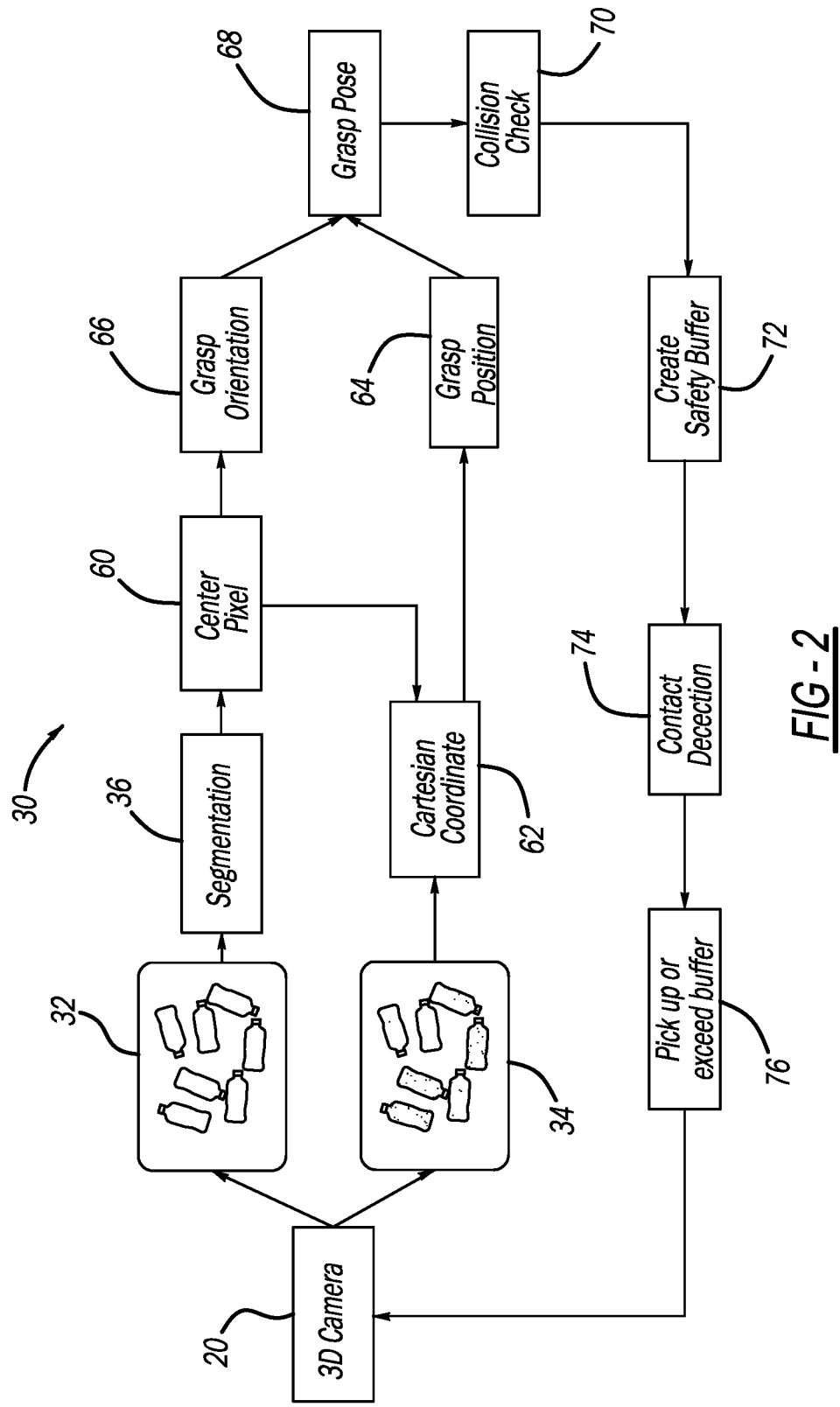
FIG. 2 is a schematic block diagram of a bin picking system for picking up the objects from the bin in the robot system shown in FIG. 1.

FIG. 2 is a schematic block diagram of a bin picking system 30 that is part of the controller 22 in the robot system 10 that operates to pick up the objects 16 out of the bin 18. The system 30 receives a 2D RGB image 32 of a top view of the bin 18 and a 2D depth map image 34 of the top view of the bin 18 from the camera 20, where the depth map image 34 may not be reliable because the objects 16 can be transparent. The image 32 is provided to a segmentation module 36 that preforms an image segmentation process, where each pixel in the image 32 is assigned a certain label and where the pixels associated with the same object 16 have the same label.

FIG. 3 is a schematic block diagram of the module 36 separated from the system 30. The RGB image 32 is provided to a feature extraction module 42 that performs a filtering process that extract features from the image 32. For example, the module 42 may include learned-based neural networks that extract gradients, edges, contours, elementary shapes, etc. from the image 32, and provides an extracted features image 44 of the RGB image 32 in a known manner. The feature image 44 is provided to a region proposal module 50 that analyzes, using neural networks, the identified features in the RGB image 32 and proposes or identifies a number of bounding boxes 52 in a bounding box image 54 that identify the probability that one of the objects 16 exists at the location of the bounding box 52 in the image 54. The bounding box image 54 is provided to a binary segmentation module 56 that estimates, using a neural network, whether a pixel belongs to one of the bounding boxes 54. The pixels are assigned a value for a particular object 16 so that a 2D segmentation image 58 is generated that identifies the objects 16 by different indicia, such as color. The image segmentation process as described is thus a modified form of a deep learning mask R-CNN (convolutional neural network).

The 2D segmentation image 58 having x-y pixel coordinates is then provided to a center pixel module 60 that determines the x-y coordinate of the center pixel of one of the objects 16 in the image 58, where a prearranged process of the order that the objects 16 are picked-up is initially provided. The identified center pixel of the selected object 16 is provided to a Cartesian coordinate module 62 along with the depth map image 34 that calculates the x-y-z Cartesian coordinate of the center pixel of that object 16, where the depth map image 34 estimates or predicts each pixels location in the real world, although the prediction is not very reliable. The x-y-z coordinate of the center pixel for that object 16 is then used to identify the x-y-z grasp position in a grasp position module 64 for positioning the end-effector 14. The x-y coordinate of the center pixel of the selected object 16 is also sent to a grasp orientation module 66 that determines the grasp orientation, i.e., the roll, pitch and yaw, of the robot 12 based on a ray direction from the camera 24 to the center pixel of the object 16 using, for example, a pin-hole camera model, well known to those skilled in the art, where the motion of the end effector 14 when it is picking up the object 16 will move along and be aligned with the ray direction. It is necessary to determine the ray direction from the camera 24 because the depth map image 34 is not able to provide an accurate distance between the camera 24 and the object 16.

The grasp position of the end-effector 14 and the grasp orientation of the end-effector 14 are combined in a grasp pose module 68 to provide the grasp pose of the end-effector 14, where the grasp pose includes the x-y-z coordinates and the yaw, pitch and roll position of the end-effector 14 to provide the approach orientation of the end-effector 14 along the ray direction to the object 16. A collision check module 70 determines whether the grasp pose will cause the end-effector 14 to collide with the bottom of the bin 18 along the calculated ray direction, where the distance to the bottom of the bin 18 is known. If the grasp pose will cause a collision with the bin 18 along the ray direction, then a safety buffer is created in a safety buffer module 72 to limit the movement of the robot 12 along the ray direction.

As the end-effector 14 moves along the ray direction it will eventually contact the object 16 being picked up, where in this embodiment, the end-effector 14 uses a vacuum cup (not shown) to pick up the object 16. A contact detection module 74 detects that the vacuum cup has made contact with the object 16 by detecting a pressure difference in the vacuum. The robot 12 stops its motion and picks up the object 16 at a pick-up module 76 or reaches the buffer distance, where it will not pick up the object 16. Once the object 16 is picked up and moved by the robot 12, the camera 20 will take new images of the bin 18 to pick up the next object 16. This process is continued until all of the objects 16 have been picked up.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for picking up an object from a group of objects, said method comprising:
obtaining a 2D red-green-blue (RGB) color image of the objects using a 3D camera;
obtaining a 2D depth map image of the objects using the 3D camera, where pixels in the depth map image are assigned a value identifying the distance from the camera to the objects;
generating a segmentation image of the objects by performing an image segmentation process that extracts features from the RGB image and assigns a label to pixels in the segmentation image so that the pixels in each object in the segmentation image have the same label and the pixels of different objects in the segmentation image have different labels including objects that have a same or similar shape, wherein obtaining a color image, obtaining a depth map image and generating a segmentation image are performed each time an object is picked up from the group of objects; and identifying a location for picking up the object using the segmentation image and the depth map image.

2. The method according to claim 1 wherein generating a segmentation image includes using a deep learning mask R-CNN (convolutional neural network).

3. The method according to claim 1 wherein generating a segmentation image includes generating bounding boxes from the extracted features that identify a probability that one of the objects exists at a certain location.

4. The method according to claim 3 wherein generating bounding boxes includes using a region proposal process.

5. The method according to claim 3 wherein generating a segmentation image includes providing binary segmentation that determines what image pixels belong to what bounding box.

6. The method according to claim 1 wherein identifying a location for picking up the object includes identifying a center pixel of the object in the segmentation image and calculating x-y-z coordinates of the center pixel using the segmentation image and the depth map image.

7. The method according to claim 6 wherein identifying a location for picking up the object includes determining an x-y-z grasp position for picking up the object.

8. The method according to claim 7 wherein identifying a location for picking up the object includes identifying a grasp orientation for picking up the object that is defined by a ray direction from the camera to the center pixel.

9. The method according to claim 8 wherein the ray direction is determined by a pin-hole camera model.

10. The method according to claim 8 wherein identifying a location for picking up the object includes determining a grasp pose for picking up the object using the grasp position and the grasp orientation.

11. The method according to claim 10 wherein the object is picked up by a robot and the grasp pose determines the pose of a robot end-effector.

12. The method according to claim 11 further comprising providing a collision limit for the end-effector.

13. The method according to claim 1 wherein the objects are transparent.

14. The method according to claim 1 wherein the objects have more than one shape.

15. A method for picking up a transparent object from a group of transparent objects using a robot, said method comprising:
obtaining a 2D red-green-blue (RGB) color image of the objects using a 3D camera;
obtaining a 2D depth map image of the objects using the 3D camera, where pixels in the depth map image are assigned a value identifying the distance from the camera to the objects;
generating a segmentation image of the objects by performing an image segmentation process using a deep learning mask R-CNN (convolutional neural network) that extracts features from the RGB image and assigns a label to pixels in the segmentation image so that each object in the segmentation image has the same label and the pixels of different objects in the segmentation image have different labels including objects that have a same or similar shape; and
identifying a location for picking up the object using the segmentation image and the depth map image, wherein obtaining a color image, obtaining a depth map image, generating a segmentation image and identifying a location for picking up the object are performed each time an object is picked up from the group of objects by the robot.

16. The method according to claim 15 wherein generating a segmentation image includes generating bounding boxes from the extracted features that identify the probability that one of the objects exists at a certain location using a region proposal process, and providing binary segmentation that determines what image pixels belong to what bounding box.

17. The method according to claim 15 wherein identifying a location for picking up the object includes identifying a center pixel of the object in the segmentation image, calculating x-y-z coordinates of the center pixel using the segmentation image and the depth map image, determining an x-y-z grasp position of the robot for picking up the object, identifying a grasp orientation of the robot for picking up the object that is defined by a ray direction from the camera to the center pixel using a pin-hole camera model, and determining a grasp pose of the robot for picking up the object using the grasp position and the grasp orientation.

18. A robot system for picking up an object from a group of objects using a robot, said system comprising:
a 3D camera that provides a 2D red-green-blue (RGB) color image and a 2D depth map image of the objects;
a deep learning mask R-CNN (convolutional neural network) that generates a segmentation image of the objects by performing an image segmentation process that extracts features from the RGB image and assigns a label to pixels in the segmentation image so that the pixels in each object in the segmentation image have the same label and the pixels of different objects in the segmentation image have different labels including objects that have a same or similar shape; and
means for identifying a location for picking up the object using the segmentation image and the depth map image, wherein obtaining a color image, obtaining a depth map image, generating a segmentation image and identify a location for picking up the object are performed each time an object is picked up from the group of objects by the robot.

19. The system according to claim 18 wherein the means for identifying a location for picking up the object identifies a center pixel of the object in the segmentation image, calculates x-y-z coordinates of the center pixel using the segmentation image and the depth map image, determines an x-y-z grasp position of the robot for picking up the object, identifies a grasp orientation of the robot for picking up the object that is defined by a ray direction from the camera to the center pixel using a pin-hole camera model, and determines a grasp pose of the robot for picking up the object using the grasp position and the grasp orientation.

20. A method for picking up an object from a group of objects, said method comprising:
obtaining a 2D red-green-blue (RGB) color image of the objects using a 3D camera;
obtaining a 2D depth map image of the objects using the 3D camera, where pixels in the depth map image are assigned a value identifying the distance from the camera to the objects;
generating a segmentation image of the objects by performing an image segmentation process that extracts features from the RGB image and assigns a label to pixels in the segmentation image so that each object in the segmentation image has the same label; and
identifying a location for picking up the object using the segmentation image and the depth map image, wherein identifying a location for picking up the object includes identifying a center pixel of the object in the segmentation image, calculating x-y-z coordinates of the center pixel using the segmentation image and the depth map image, determining an x-y-z grasp position for picking up the object and identifying a grasp orientation for picking up the object that is defined by a ray direction from the camera to the center pixel.

\* \* \* \* \*